(12) United States Patent
Lee et al.

(10) Patent No.: US 10,206,219 B2
(45) Date of Patent: Feb. 12, 2019

(54) BASE STATION APPARATUS AND RESOURCE MANAGEMENT METHOD AND DATA PROCESSING METHOD IN WIRELESS COMMUNICATION SYSTEM

(71) Applicant: KT CORPORATION, Gyeonggi-do (KR)

(72) Inventors: Ki-Ho Lee, Gyeonggi-do (KR); Byungsuk Kim, Seoul (KR); Seongkwan Kim, Seoul (KR); YongGyoo Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 145 days.

(21) Appl. No.: 15/072,513

(22) Filed: Mar. 17, 2016

(65) Prior Publication Data

US 2016/0278110 A1    Sep. 22, 2016

(30) Foreign Application Priority Data

Mar. 17, 2015   (KR) .................. 10-2015-0036987
Jul. 29, 2015   (KR) .................. 10-2015-0107567

(51) Int. Cl.

| | |
|---|---|
| *H04W 72/12* | (2009.01) |
| *H04W 56/00* | (2009.01) |
| *H04W 88/08* | (2009.01) |
| *H04W 52/02* | (2009.01) |
| *H04W 28/16* | (2009.01) |

(52) U.S. Cl.
CPC ....... *H04W 72/12* (2013.01); *H04W 52/0216* (2013.01); *H04W 52/0219* (2013.01); *H04W 56/001* (2013.01); *H04W 88/085* (2013.01); *H04W 28/16* (2013.01); *H04W 88/08* (2013.01); *Y02D 70/00* (2018.01)

(58) Field of Classification Search
CPC ............. H04W 72/12; H04W 52/0216; H04W 52/0219; H04B 7/04
See application file for complete search history.

(56) References Cited

U.S. PATENT DOCUMENTS

2010/0046418 A1* 2/2010 Horn ..................... H04W 40/22
                                                        370/315
2010/0067604 A1   3/2010 Bhadra et al.
(Continued)

FOREIGN PATENT DOCUMENTS

KR   10-2011-0045936 A    5/2011
KR   10-2011-0126177 A   11/2011
(Continued)

*Primary Examiner* — Siming Liu
(74) *Attorney, Agent, or Firm* — IP Legal Services, LLC

(57) ABSTRACT

Disclosed herein are a base station apparatus, a resource management method, and a data processing method. The base station apparatus includes: a remote active antenna unit configured to perform transmission and reception of a wireless signal to and from a terminal; and a central unit connected to the remote active antenna unit, configured to process a signal received from the terminal or a signal to be transferred to the terminal, and configured to transfer resource allocation information to the remote active antenna unit, in which the remote active antenna unit schedules a data and a resource for the terminal based on resource allocation information received from the central unit.

24 Claims, 9 Drawing Sheets

(56) References Cited

U.S. PATENT DOCUMENTS

| | | |
|---|---|---|
| 2011/0096736 A1 | 4/2011 | Kwon et al. |
| 2012/0014315 A1 | 1/2012 | Yang et al. |
| 2012/0165055 A1* | 6/2012 | Lee .................... H04W 88/085 455/507 |
| 2012/0176980 A1* | 7/2012 | Moon ............... H04W 72/1226 370/329 |
| 2012/0230282 A1* | 9/2012 | Wu .................... H04W 88/085 370/329 |
| 2013/0107737 A1 | 5/2013 | Lee et al. |
| 2013/0107821 A1 | 5/2013 | Lee et al. |
| 2013/0137436 A1 | 5/2013 | Lee et al. |
| 2014/0369305 A1 | 12/2014 | Lee et al. |
| 2015/0004983 A1 | 1/2015 | Lee et al. |
| 2015/0092676 A1* | 4/2015 | Periyalwar .......... H04W 76/025 370/329 |
| 2015/0350922 A1 | 12/2015 | Lee et al. |

FOREIGN PATENT DOCUMENTS

| | | | |
|---|---|---|---|
| KR | 10-2012-0061881 A | 6/2012 | |
| KR | 10-1472100 B1 | 12/2014 | |
| WO | WO 2016041595 A1 * | 3/2016 | ............ H04W 16/10 |

* cited by examiner

BASE STATION APPARATUS AND RESOURCE MANAGEMENT METHOD AND DATA PROCESSING METHOD IN WIRELESS COMMUNICATION SYSTEM

CROSS-REFERENCE TO RELATED APPLICATION

This application claims priority to and the benefit of Korean Patent Application No. 10-2015-0036987 and 10-2015-0107567 filed in the Korean Intellectual Property Office on Mar. 17, 2015 and Jul. 29, 2015, the entire contents of which are incorporated herein by reference.

BACKGROUND OF THE INVENTION (a) Field of the Invention

The present disclosure relates to a base station apparatus, a resource management method, and a data processing method, and more particularly, to a base station apparatus, a resource management method, and a data processing method in a wireless communication system supporting a cloud communication center.

(b) Description of the Related Art

To improve efficiency of network resources, there has been a growing interest in a cloud communication center (CCC) technology. According to the cloud communication center technology, it is possible to reduce operation cost and power consumption while greatly increasing a wireless data capacity compared to the related art.

Typically, a digital unit (DU) and a radio unit (RU) are installed in one apparatus, such as a typical base station. The cloud communication center technology spatially separates a digital unit from a radio unit. For example, the digital unit (DU) is installed at a DU center separately provided in a central communication station, and the radio unit is installed at a service target area (e.g., a cell).

In this case, the digital unit performs a radio resource management (RRC) function, a local gateway (LGW) function, and a cache function. Further, the digital unit uses radio protocol layers including a medium access control (MAC) layer, a radio link control (RLC) layer, a packet data convergence protocol (PDCP) layer, and a radio resource control (RRC) layer.

The radio unit (RU) includes an RF function and uses a physical layer (PHY) as the radio protocol layer. In such as a base station structure, the digital unit (DU) manages a scheduling of the radio unit (RU).

In this case, latency between the digital unit (DU) and the radio unit (RU) is several hundreds of µs. Accordingly, when retransmission is required due to channel error generated after the digital unit (DU) already perform the scheduling for the retransmission, the digital unit (DU) needs to perform retransmission scheduling again. Therefore, it is difficult to perform the direct retransmission. Such a problem makes it difficult for next-generation systems (e.g., $5^{th}$ generation (5G) communication system) to satisfy an end to end latency reference 1 ms. Furthermore, a typical separation structure of a base station, such as a digital unit (DU)-and-a radio unit (RU) structure, uses a common public radio interface (CPRI). In the case of using the CPRI, a very high data transmit rate is required in order to apply a next-generation technologies such as a massive multiple input multiple output (MIMO). In order to provide such a very high data transmit rate, additional implementation, such as an optical infrastructure, is also required.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present disclosure have been made in an effort to provide a next-generation base station structure and a data processing method having advantage of shortening end to end latency by proposing a new separate type structure in a separate type base station apparatus to realize a fast scheduling in a radio contact section and reducing a required bandwidth between separate type base station interfaces upon application of a next-generation core technology such as massive MIMO.

In accordance with an exemplary embodiment of the present disclosure, a base station apparatus is provided. The base station apparatus may include a remote active antenna unit and a central unit. The remote active antenna unit is configured to perform transmission and reception of a wireless signal to and from a terminal. The central unit is connected to the remote active antenna unit. The central unit is configured to process a signal received from the terminal or a signal to be transferred to the terminal and transfer resource allocation information to the remote active antenna unit.

The remote active antenna unit may be configured to schedule a data and a resource for the terminal based on resource allocation information received from the central unit. The remote active antenna unit may include a distributed radio resource manager performing scheduling for allocating a radio resource to the terminal based on the resource allocation information.

The central unit may include a concentrated-radio resource manager. The concentrated-radio resource manager may be configured to receive a radio resource allocation requirement and channel state information of the terminal from the distributed radio resource manager and configured to transfer the resource allocation information to the distributed radio resource manager based on the received information. The distributed radio resource manager and the concentrated-radio resource manager are connected to each other by a radio resource management interface.

One central unit may be connected to a plurality of remote active antenna units, and one concentrated-radio resource manager may be connected to a plurality of distributed radio resource managers.

The distributed radio resource manager may be configured to perform a coordinated multipoint operation including at least one of transport packet synchronization between Tx points (TPs), a retransmission control and a scheduling control, and optimal precoding of the Tx point (TP), based on the radio resource management information received from the concentrated-radio resource manager.

The remote active antenna unit may be configured to upgrade the distributed radio resource manager using a software data received from an external apparatus based on a software defined radio (SDR) technology.

The plurality of protocol layers may be distributed in the remote active antenna unit and the central unit and the remote active antenna unit and the central unit may be connected to each other by a user plane interface and a control plane interface between the protocol layers.

The remote active antenna unit may include a radio link control layer, the central unit may include a packet data convergence protocol layer, and the radio link control layer and the packet data convergence protocol layer may be connected to each other by the user plane interface and the control plane interface.

The remote active antenna unit may include an active antenna system, a physical layer, a medium access control layer, and a radio link control layer. The remote active antenna unit may install and upgrade the active antenna system, the physical layer, the medium access control layer, and the radio link control layer using the software data received from the external apparatus based on the software defined radio (SDR) technology.

The central unit may include a packet data convergence protocol layer and a radio resource control layer, and may transfer and receive a control plane data transferred and received to and from the remote active antenna unit using the packet data convergence protocol layer to and from the evolved packet core using the radio resource control layer.

The central unit may use a radio protocol layer including a packet data convergence protocol layer, a radio resource control layer, an S1 application part (S1AP) layer, and a general tunneling protocol layer. The central unit may be configured to transfer and receive a user plane data transferred and received to and from the remote active antenna unit using the packet data convergence protocol layer to an evolved packet core connected to the S1AP interface using the general tunneling protocol layer.

The central unit may be operated on a virtualization platform. The central unit may include a local gateway providing a local brake out service and a cache storing a data to be transferred to the terminal.

In accordance with another embodiment of the present disclosure, a base station apparatus may include a remote active antenna unit and a central unit. The remote active antenna unit may be configured to perform transmission and reception of a wireless signal to and from a terminal. The central unit may be connected to the remote active antenna unit and configured to transfer resource allocation information to the remote active antenna unit.

The remote active antenna unit may be configured to schedule a data and a resource for the terminal based on the resource allocation information received from the central unit. The remote active antenna unit may include a plurality of protocol layers connected to an evolved packet core.

The remote active antenna unit may include: a radio resource control layer, an S1 application part (S1AP) layer, and a general tunneling protocol layer. The radio resource control layer and the S1AP layer may be connected to each other by the evolved packet core and a control plane interface. The general tunneling protocol layer may be connected to the evolved packet core by a user plane interface.

The remote active antenna unit may include a distributed radio resource manager configured to perform scheduling for allocating a radio resource to the terminal based on the resource allocation information. The central unit may include a concentrated-radio resource manager receiving a radio resource allocation requirement and channel state information of the terminal from the distributed radio resource manager and transferring the resource allocation information to the distributed radio resource manager based on the received information. The distributed radio resource manager and the concentrated-radio resource manager may be connected to each other by a radio resource management interface.

One central unit may be connected to a plurality of remote active antenna units, and one concentrated-radio resource manager may be connected to a plurality of distributed radio resource managers.

The distributed radio resource manager may perform a coordinated multipoint operation including at least one of transport packet synchronization between Tx points (TPs), a retransmission control and a scheduling control, and optimal precoding of the Tx point (TP), based on the radio resource management information received from the concentrated-radio resource manager.

The remote active antenna unit may use a protocol layer including an active antenna system, a physical layer, a medium access control layer, a radio link control layer, a packet data convergence protocol layer, a radio resource control layer, an S1AP layer, and a general tunneling protocol layer.

The remote active antenna unit may be configured to upgrade the protocol layer and the distributed radio resource manager using a software data received from an external apparatus based on a software defined radio (SDR) technology.

In accordance with yet another embodiment of the present disclosure a method of a base station apparatus may be provided for resource management. The method may include the remote active antenna unit and the central unit, including: receiving, by the central unit, a radio resource allocation requirement and channel state information of a terminal from the remote active antenna unit; transferring resource allocation information to the remote active antenna unit based on the radio resource allocation requirement and the channel state information; and scheduling, by the remote active antenna unit, a data and a resource for the terminal based on the resource allocation information.

In the scheduling, a coordinated multipoint operation including at least one of transport packet synchronization between Tx points (TPs), a retransmission control and a scheduling control, and optimal precoding of the Tx point (TP), based on the resource allocation information may be performed.

In accordance with still another embodiment of the present disclosure, a method of a base station apparatus may be provided for data processing. The base station apparatus may include a remote active antenna unit and a central unit. The method may include processing, by the central unit, a control plane data and a user plane data received from an evolved packet core; transferring, by the central unit, the control plane data and the user plane data to the remote active antenna unit through an interface between the protocol layers distributed in the remote active antenna unit and the central unit, and transferring, by the remote active antenna unit, the control plane data and the user plane data received from the central unit to the terminal.

The interface between the protocol layers may be an interface between a packet data convergence protocol layer, a radio resource control layer, an S1 application part (S1AP) layer, and a general tunneling protocol layer that are distributed in the central unit and a radio link control layer, a medium access control layer, and a physical layer that are distributed in the remote active antenna unit.

In accordance with still yet another embodiment of the present disclosure, a method of a base station apparatus may be provided for data processing. Herein, the base station may include a remote active antenna unit and a central unit. The method may include receiving, by the remote active antenna unit connected to the central unit by a radio resource management interface, a control plane data and a user plane data from an evolved packet core; and transferring the control plane data and the user plane data to a terminal.

The receiving may include: receiving the control plane data using the radio resource control layer and the S1AP layer connected to the evolved packet core; and receiving the user plane data using a general tunneling protocol layer connected to the evolved packet core.

According to an exemplary embodiment of the present disclosure, it is possible to minimize the scheduling latency by directly performing the scheduling at the terminal contact area, by dispersing the MAC layer, the RLC layer, and the RRM function included in the existing digital unit (DU) with the remote active antenna unit.

DETAILED DESCRIPTION OF THE EMBODIMENTS

Figure 1:
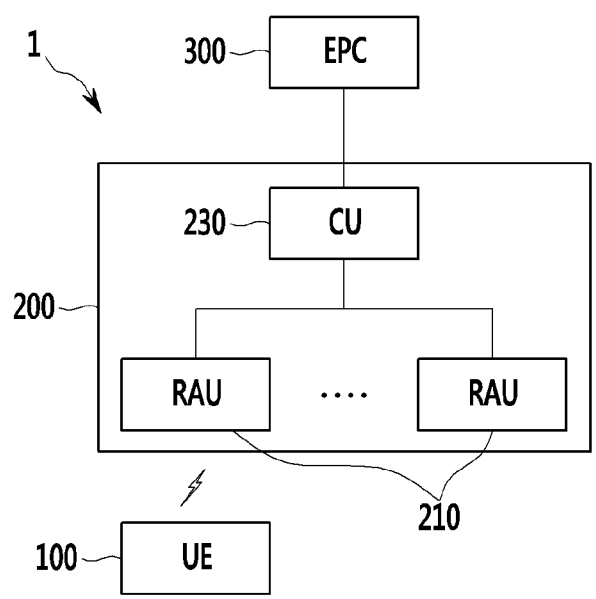
FIG. 1 is a diagram illustrating a configuration of a radio communication system according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, "comprising" any components will be understood to imply the inclusion of other elements rather than the exclusion of any other elements.

In the specification, a terminal may be referred to as a mobile station (MS), a mobile terminal (MT), a subscriber station (SS), a portable subscriber station (PSS), user equipment (UE), an access terminal (AT), or the like, and may include all or a portion of functions of the mobile station, the mobile terminal, the subscriber station, the portable subscriber station, the user equipment, the access terminal, or the like. In the present specification, a base station (BS) may be referred to as an access point (AP), a radio access station (RAS), a node B, an evolved node B (eNodeB), a base transceiver station (BTS), a mobile multihop relay (MMR)-BS, or the like, and may also include all or a portion of the access point, the radio access station, the node B, the eNodeB, the base transceiver station, the MMR-BS, or the like.

Embodiments of the present disclosure may also be used in any radio communication system (for example, IEEE) supporting a cloud communication center (CCC) technology.

Hereinafter, a base station apparatus, a resource management method, and a data processing method according to at least one embodiment of the present disclosure will be described in detail with reference to the accompanying drawings.

FIG. 1 is a schematic diagram of a wireless communication system according to an exemplary embodiment of the present disclosure.

Referring to FIG. 1, a wireless communication system 1 includes a terminal 100, a base station apparatus 200, and an evolved packet core (EPC) 300.

The base station apparatus 200 controls transmission of data to and reception of data from the plurality of terminals 100. The base station apparatus 200 for downlink (DL) data transfers downlink scheduling information to inform the corresponding terminal 100 of a time/frequency domain where a data is transferred, coding, a data size, hybrid automatic repeat and reQuest (HARQ) related information, etc.

Further, the base station apparatus 200 for an uplink (UL) data transfers uplink scheduling information to the corresponding terminal 100 to inform the time/frequency domain, the coding, the data size, the HARQ related information, etc., which may be used by the corresponding terminal 100.

The base station apparatus 200 includes a remote active antenna unit (RAU) 210 and a central unit (CU) 230. The remote active antenna unit (RAU) 210 may be positioned outside a communication station and the central unit (CU) 230 may be positioned at the station.

The remote active antenna unit (RAU) 210 is an apparatus installed in a service area (e.g., a cell site). The remote active antenna unit (RAU) 210 includes a radio unit (RU) and an active antenna system (AAS). The radio unit (RU) transmits a radio signal to the terminal 100 and receives a radio signal from the terminal 100. The active antenna system (hereinafter, referred to as 'AAS') is integrated therein. Here, the radio unit (RU) may include a frequency up conversion module, a frequency down conversion module, a power amplifier, and a filter.

The central unit (CU) 230 is an apparatus controlling the remote active antenna unit (RAU) 210 and is connected to the remote active antenna unit (RAU) 210. The central unit (CU) 230 processes a signal received from the terminal 100 and a signal to be transferred to the terminal 100. The central unit (CU) 230 allocates resource allocation information to the remote active antenna unit (RAU) 210. The remote active antenna unit (RAU) 210 schedules a data and a resource for the terminal 100 based on the resource allocation information received from the central unit (CU) 230.

Figure 2:
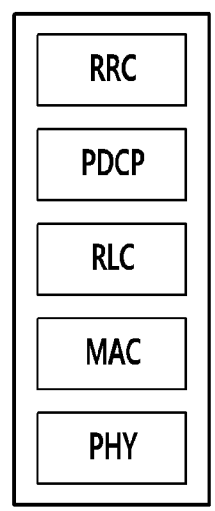
FIG. 2 is a diagram illustrating an example of a structure of a radio interface protocol layer.

FIG. 2 is a diagram illustrating an example of a hierarchical structure of a radio interface protocol.

Referring to FIG. 2, a hierarchical structure includes a physical layer (PHY), a data link layer, and a network layer. The protocol layer may be divided into an L1 a first layer (L1), a second layer (L2), and a third layer (L3) based on lower three layers of an open system interconnection (OSI) reference model.

The PHY layer uses a physical channel to provide an information transfer service to an upper layer. The PHY layer is connected to a medium access control (MAC) at an upper portion via a transmission channel. A data is transferred between a transferring side and a receiving side through the physical channel.

The MAC layer provides a service to a radio link control (hereinafter, referred to as 'RLC') layer, that is the upper layer, through a logical channel.

A function of the RLC layer may also be implemented as a function block in the MAC layer. In this case, the RLC layer may not be present.

A packet data convergence protocol (PDCP) layer performs a header compression function of reducing unnecessary control information to efficiently transfer IP packets such as an internet protocol version 4 (IPv4) or an internet protocol version 6 (IPv6) at a radio interface having a narrow bandwidth upon the transmission of the IP packet.

The radio resource control (RRC) layer is defined only in a control plane and is responsible for a control of a logical channel, a transmission channel, and physical channels by being associated with a configuration, a re-configuration, and a release of radio bearers (RBs). The RB means a service provided by the second layer to transfer a data between the terminal and the network. To this end, the RRC layer exchanges an RRC message between the terminal and the network. When the RRC connection is present between the RRC layer of the terminal and the RRC layer of the radio network, the terminal is in an RRC connected mode or otherwise is in an RRC idle mode.

Here, the PHY layer is the L1 layer, the MAC layer, the RLC layer, and the PDCP layer are the L2 layer, and the RRC layer is the L3 layer.

The signal processing of the base station apparatus 200 is performed according to a protocol layer (function or module) defined in the radio communication system of FIG. 2. The protocol layers required to process the signal may be distributed in the remote active antenna unit (RAU) 210 and the central unit (CU) 230 or all of the protocol layers may be included only in the remote active antenna unit (RAU) 210.

Figure 3:
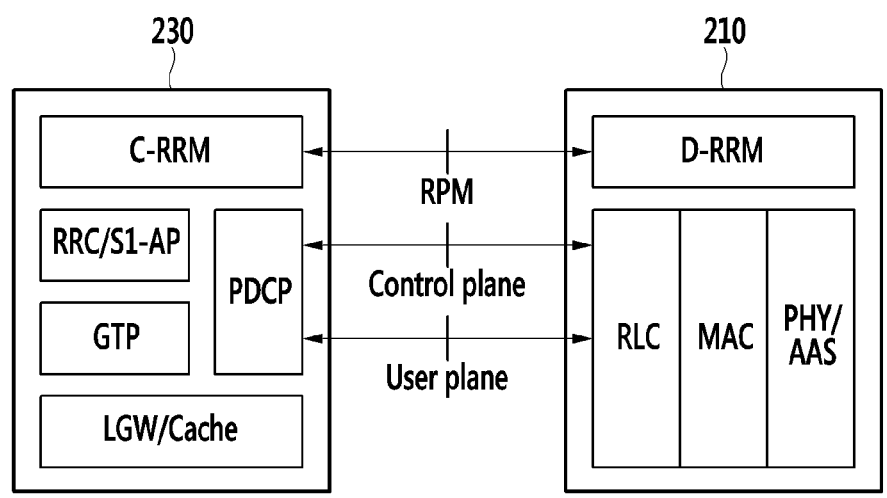
FIG. 3 is a diagram illustrating a structure of a base station apparatus according to an exemplary embodiment of the present disclosure.

FIG. 3 is a diagram illustrating a structure of a base station apparatus according to an exemplary embodiment of the present disclosure, which corresponds to an exemplary embodiment in which the protocol layers required to process the signal are distributed in the remote active antenna unit (RAU) 210 and the central unit (CU) 230.

Referring to FIG. 3, the remote active antenna unit (RAU) 210 includes a distributed radio resource manager (D-RRM), the PHY layer, an AAS, the MAC layer, and the RLC layer.

The central unit (CU) 230 is connected to the remote active antenna unit (RAU) 210 and includes a data processor for processing the signal received from the terminal 100 and the signal to be transferred to the terminal 100. Further, the central unit (CU) 230 may be connected to the evolved packet core (EPC) 300 and may transfer the signal received from the terminal 100 to the evolved packet core (EPC) 300 and transfer the signal received from the evolved packet core (EPC) 300 to the terminal 100.

The central unit (CU) 230 includes a central radio resource manager (C-RRM), the PDCP layer, the RRC layer, an S1 application part (S1AP) layer, a general tunneling protocol (GTP) layer, a local gateway (LGW), and a cache.

The structure of the base station apparatus may improve the number of cells (RU)s managed per the base station by sharing the RRC and improve the number of users serviced by virtualizing a call processing function.

The central unit (CU) 230 is connected to the evolved packet core (EPC) 300 through the S1AP interface.

The C-RRM and the D-RRM are connected to each other by a radio resource management (RRM) interface. The RRM interface may additionally define and use a new information element in an X2-AP protocol.

The C-RRM receives the radio resource allocation requirement and the channel state information of the terminal 100 from the D-RRM and transfers the resource allocation information based on the received information to the D-RRM.

The D-RRM performs a coordinated multipoint operation (e.g., a joint transmission), a CoMP function of coordinated scheduling by controlling the PHY layer, the MAC layer, and the RLC layer based on the resource management information received from the C-RRM. That is, the CoMP function including at least one of the transport packet synchronization between Tx points (TP) transferring a downlink signal to the terminal 100, the retransmission control and the scheduling control, and optimal precoding of the Tx point (TP) is performed.

The MAC and the RLC serve to allocate a resource for data transmission.

As such, the D-RRM, the PHY layer, the MAC layer, and the RLC layer may be implemented in the remote active antenna unit (RAU) 210 to directly perform the scheduling at a terminal contact area, thereby minimizing scheduling latency.

Further, the remote active antenna unit (RAU) 210 and the central unit (CU) 230 are connected to each other by an interface between the protocol layers. The RLC layer of the remote active antenna unit (RAU) 210 and the PDCP layer of the central unit (CU) 230 are connected to each other by a control plane interface and a user plane interface.

The central unit (CU) 230 transfers and receives a control plane data transferred and received to and from the remote active antenna unit (RAU) 210 to and from the evolved packet core (EPC) 300 using the RRC layer. The control plane data between the remote active antenna unit (RAU) 210 and the central unit (CU) 230 is transferred and received using a protocol defined as the RLC.

The central unit (CU) 230 transfers the user plane data to and receives the user plane data from the evolved packet core (EPC) 300 connected to the S1AP interface using a GTP layer. Such user plane data is transferred to and received from the remote active antenna unit (RAU). The user plane data between the remote active antenna unit (RAU) 210 and the central unit (CU) 230 is transferred and received using the protocol defined as the GTP.

The central unit (CU) 230 may reduce the latency problem. The central unit (CU) 230 may include the local gateway (LGW) providing a local brake out service and the cache storing the data to be transferred to the terminal.

Figure 4:
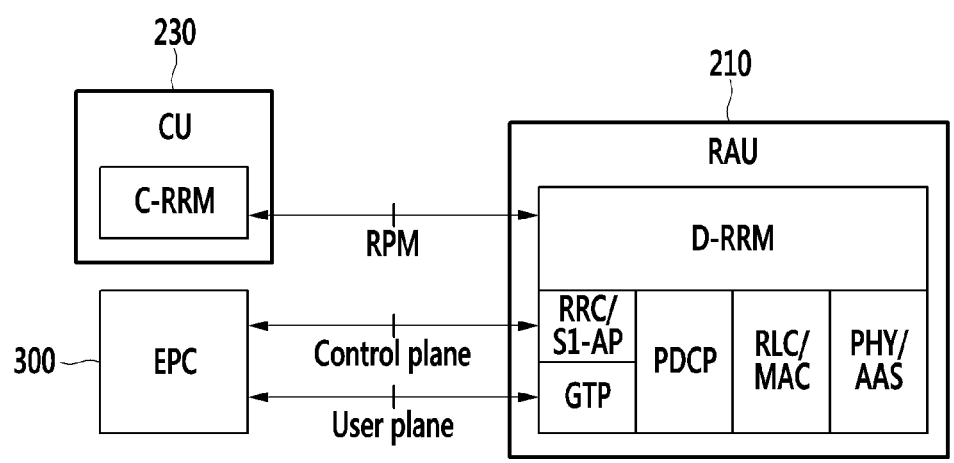
FIG. 4 is a diagram illustrating a structure of a base station apparatus according to another exemplary embodiment of the present disclosure.

FIG. 4 is a diagram illustrating a structure of a base station apparatus according to an exemplary embodiment of the present disclosure, which corresponds to an exemplary embodiment in which all of the protocol layers required to process the signal are implemented in the remote active antenna unit (RAU) 210.

As shown in FIG. 4, the base station apparatus of FIG. 4 has constituent elements similar to the base station apparatus of FIG. 3. For convenience, descriptions of the same constituent elements will be omitted herein.

Referring to FIG. 4, the central unit (CU) 230 includes the D-RRM of the remote active antenna unit (RAU) 210 and the C-RRM connected to the radio resource management interface.

The remote active antenna unit (RAU) 210 schedules the data and resource for the terminal 100 based on the resource allocation information received from the central unit (CU) 230 and includes a plurality of protocol layers connected to the evolved packet core (EPC) 300.

The remote active antenna unit (RAU) 210 includes the D-RRM, the AAS, the PHUY layer, the RLC layer, the MAC layer, the PDCP layer, the RRC layer, the S1AP layer, and the GTP layer.

The remote active antenna unit (RAU) 210 is connected to the evolved packet core (EPC) 300 by the control plane interface and the user plane interface.

The remote active antenna unit (RAU) 210 uses the protocol defined as the RRC to transfer and receive the control plane data to and from the evolved packet core (EPC) 300.

The remote active antenna unit (RAU) 210 is the S1AP interface and is connected to the evolved packet core 300 and uses the protocol defined as the GTP to transfer and receive the user plane data to and from the evolved packet core (EPC) 300. Here, the remote active antenna unit (RAU) 210 uses a software data received from an external apparatus to install and upgrade the D-RRM, the AAS, the PHUY layer, the RLC layer, the MAC layer, the PDCP layer, the RRC layer, the S1AP layer, and the GTP layer using an SDR technology.

Further, the D-RRM, the AAS, the PHUY layer, the RLC layer, the MAC layer, the PDCP layer, the RRC layer, the S1AP layer, and the GTP layer may be each implemented in a hardware module and therefore may have a structure that may be easily replaced.

As such, a main eNodeB function may be implemented in the remote active antenna unit (RAU) 210 to facilitate development of a femto cell and MVI.

Meanwhile, the structure of the base station apparatus described with reference to FIG. 3 and the structure of the base station apparatus described with reference to FIG. 4 may be mixed in one wireless communication system. In this case, the central unit (CU) 230 performs the operation described with reference to FIG. 3 when the structure of the remote active antenna unit (RAU) 210 is the same as one illustrated in FIG. 3 but performs only the radio resource management when the structure of the remote active antenna unit (RAU) 210 is the same as one illustrated in FIG. 4.

Figure 5:
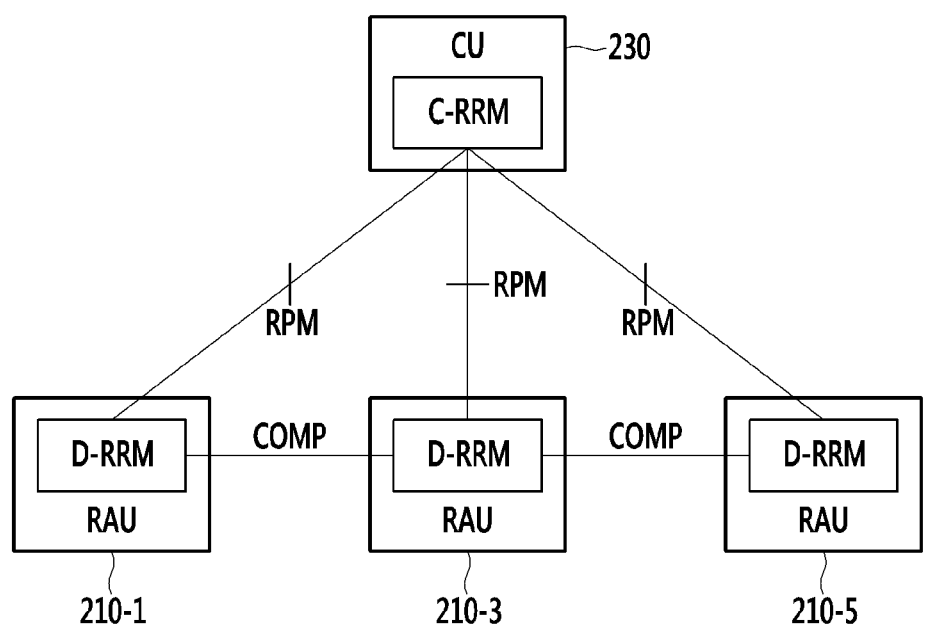
FIG. 5 is a diagram illustrating a structure of a base station apparatus according to another exemplary embodiment of the present disclosure.

FIG. 5 is a diagram illustrating a structure of a base station apparatus according to another exemplary embodiment of the present disclosure. For example, FIG. 5 illustrates an example in which one central unit (CU) is connected to the plurality of remote active antenna units (RAUs). Referring to FIG. 5, one central unit (CU) 230 is connected to a plurality of remote active antenna units (RAUs) 210-1, 210-3, and 210-5. In this case, the C-RRM of the central unit (CU) 230 is connected to the D-RRMs of each of the plurality of remote active antenna units (RAUs) 210-1, 210-3, and 210-5 through the radio resource management interface.

The C-RRM transfers the resource allocation information on each cell (RAU) based on the information received from the plurality of D-RRMs. Next, each D-RRM schedules a data and a resource based on the received resource allocation information and transfers the data and resource to the terminal 100.

As such, one C-RRM controls the radio resource management for the plurality of D-RRMs to perform the CoMP function between the cells (RAUs).

Figure 6:
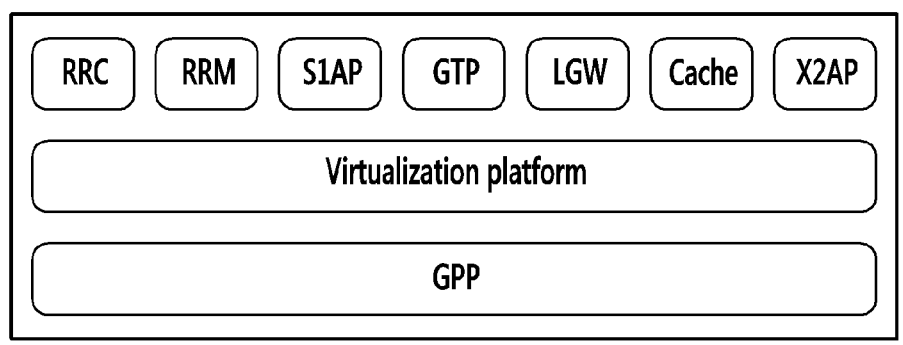
FIG. 6 is a diagram illustrating a virtualization platform structure of a central unit (CU) according to an exemplary embodiment of the present disclosure.

FIG. 6 is a diagram illustrating a virtualization platform structure of a concentrated unit (CU) according to an exemplary embodiment of the present disclosure.

Referring to FIG. 6, the central unit (CU) supports the functions such as RRC, RRM, S1AP, GTP, X2-AP, and local gateway (LGW) as virtualization platforms on a general purpose H/W platform based on a general purpose processor (GPP). Further, the central unit (CU) may acquire the user information based on the RRC, the GTP, the S1AP, and the X2AP and provide the API based thereon, thereby providing various application services.

Figure 7:
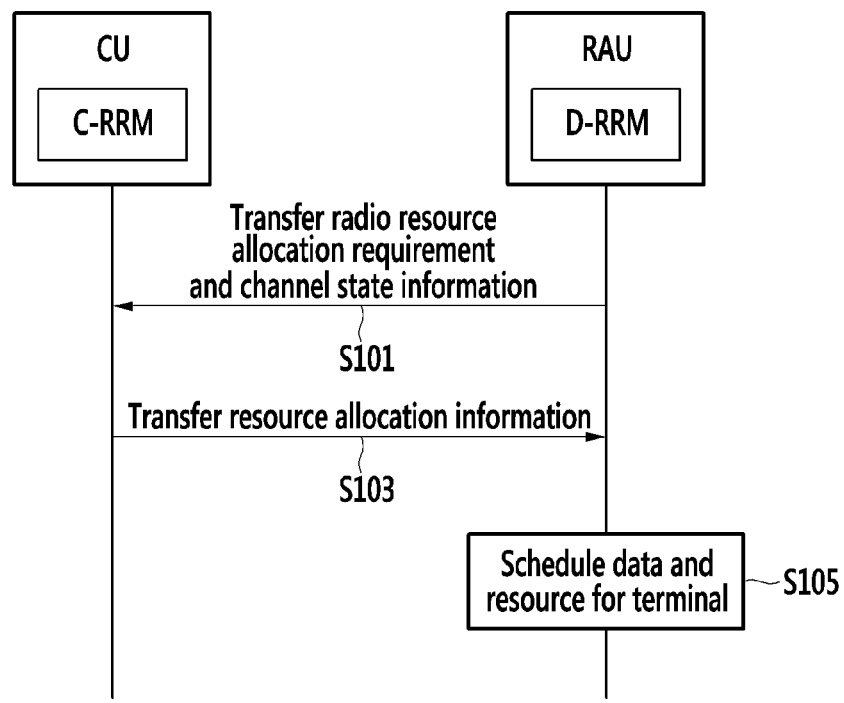
FIG. 7 is a flow chart illustrating a resource management method of a base station apparatus according to the exemplary embodiment of the present disclosure.

FIG. 7 is a flow chart illustrating a resource management method of a base station apparatus according to the exemplary embodiment of the present disclosure.

Referring to FIG. 7, the D-RRMs of at least one remote active antenna unit (RAU) each transfers the radio resource allocation requirement and the channel state information of the terminal to the C-RRM of the central unit (CU).

The C-RRM of the central unit (CU) transfers the resource allocation information based on the radio resource allocation requirement and the channel state information to the D-RRM of at least one remote active antenna unit (RAU) (S103).

The D-RRM of at least one remote active antenna unit (RAU) schedules the data and resource for the terminal based on the received resource allocation information (S105).

Figure 8:
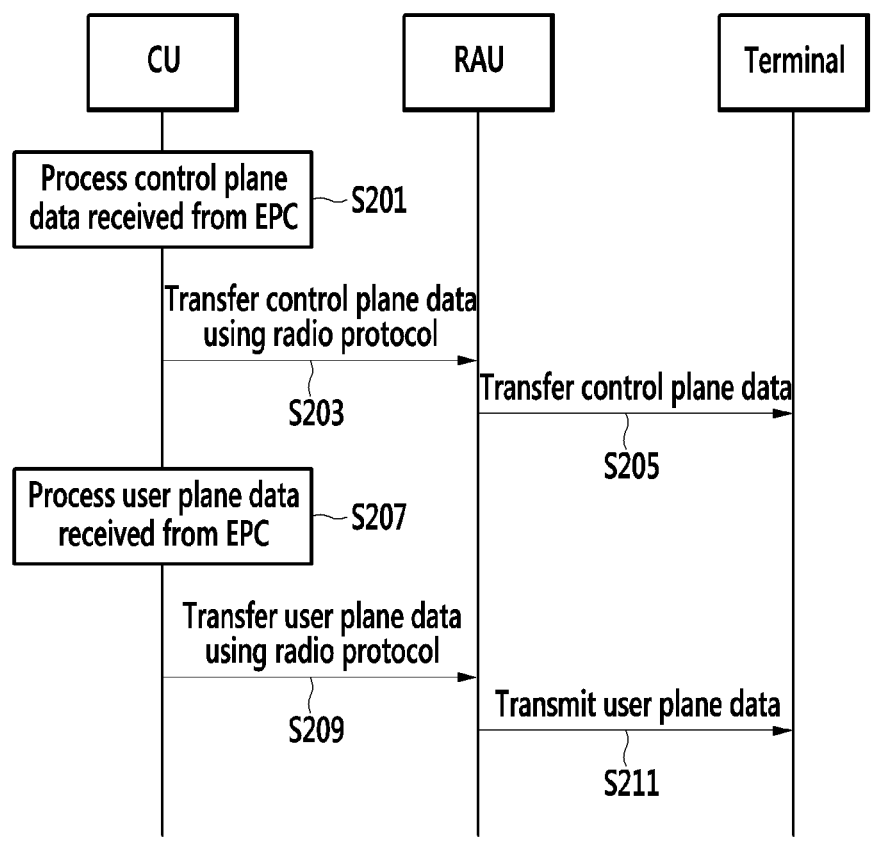
FIG. 8 is a flow chart illustrating a data processing method of a base station apparatus according to an exemplary embodiment of the present disclosure.

FIG. 8 is a flow chart illustrating a data processing method of a base station apparatus according to an exemplary embodiment of the present disclosure and illustrates the data processing method of the base station apparatus of FIG. 3.

Referring to FIG. 8, the central unit (CU) processes the control plane data received from the evolved packet core (EPC) (S201) and then uses the radio protocol dispersed in the central unit (CU) and the remote active antenna unit (RAU) to transfer the control plane data to at least one remote active antenna unit (RAU) (S203). Next, at least one remote active antenna unit (RAU) transfers the control plane data to the terminal (S205).

The central unit (CU) processes the user plane data received from the evolved packet core (EPC) (S207) and then uses the radio protocol dispersed in the central unit (CU) and the remote active antenna unit (RAU) to transfer the user plane data to at least one remote active antenna unit (RAU) (S209). Next, at least one remote active antenna unit (RAU) transfers the user plane data to the terminal (S210).

Here, the terminal transmits the control plane data and the user plane data. Such control plane data and user plane data are transferred from the remote active antenna unit (RAU) to the central unit (CU) using the radio protocols which are distributed in the remote active antenna unit (RAU) and the central unit (CU). Furthermore, the control plane data and the user plane data are delivered to the evolved packet core (EPC) through the central unit (CU).

Figure 9:
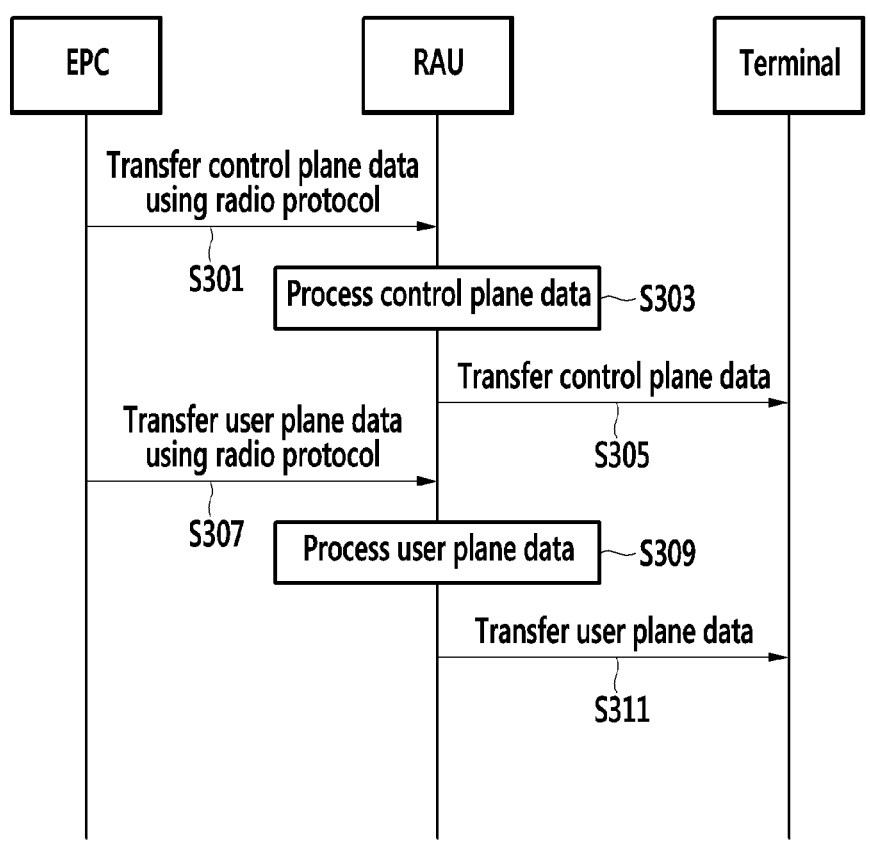
FIG. 9 is a flow chart illustrating a data processing method of a base station apparatus according to another exemplary embodiment of the present disclosure.

FIG. 9 is a flow chart illustrating a data processing method of a base station apparatus according to another exemplary embodiment of the present disclosure and illustrates the data processing method of the base station apparatus of FIG. 4.

Referring to FIG. 9, at least one remote active antenna unit (RAU) uses the radio protocol from the evolved packet core (EPC) to receive the control plane data (S301) and process it (S303) and then transfer the processed control plane data to the terminal 100 (S305).

At least one remote active antenna unit (RAU) uses the radio protocol from the evolved packet core (EPC) to receive the user plane data (S307) and process it (S309) and then transfer the processed user plane data to the terminal 100 (S311).

Here, the terminal transmits the control plane data and the user plane data. The control plane data and the user plane data are delivered from the remote active antenna unit (RAU) to the evolved packet core (EPC) using the radio protocol in each remote active antenna unit (RAU).

The foregoing exemplary embodiments of the present invention are not implemented only by an apparatus and a method, and therefore, may be realized by programs realizing functions corresponding to the configuration of the exemplary embodiment of the present invention or recording media on which the programs are recorded Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A base station apparatus, comprising:
a remote active antenna unit configured to perform transmission and reception of a wireless signal to and from a terminal; and
a central unit connected to the remote active antenna unit, configured to process at least one of a signal received from the terminal and a signal to be transferred to the terminal, and configured to transfer resource allocation information to the remote active antenna unit,
wherein the remote active antenna unit is configured to schedule a data and a resource for the terminal based on resource allocation information received from the central unit,
wherein the remote active antenna unit performs a coordinated multipoint operation including transport packet synchronization between Tx points (TPs), a retransmission control and a scheduling control, and optimal precoding of the Tx point (TP), based on the resource allocation information received from the central unit.

2. The base station apparatus of claim 1, wherein:
the remote active antenna unit includes
a distributed radio resource manager configured to perform scheduling for allocating a radio resource to the terminal based on the resource allocation information, and
the central unit includes
a concentrated-radio resource manager configured to receive a radio resource allocation requirement and channel state information of the terminal from the distributed radio resource manager and transfer the resource allocation information to the distributed radio resource manager based on the received information, and
the distributed radio resource manager and the concentrated-radio resource manager are connected to each other by a radio resource management interface.

3. The base station apparatus of claim 2, wherein:
one central unit is connected to a plurality of remote active antenna units, and
one concentrated-radio resource manager is connected to a plurality of distributed radio resource managers.

4. The base station apparatus of claim 2, wherein:
the distributed radio resource manager is configured to perform the coordinated multipoint operation based on radio resource management information received from the concentrated-radio resource manager.

5. The base station apparatus of claim 2, wherein:
the remote active antenna unit is configured to upgrade the distributed radio resource manager using a software data received from an external apparatus based on a software defined radio (SDR) technology.

6. The base station apparatus of claim 1, wherein:
a plurality of protocol layers are distributed in the remote active antenna unit and the central unit and the remote active antenna unit and the central unit are connected to each other by a user plane interface and a control plane interface between protocol layers.

7. The base station apparatus of claim 1, wherein:
the remote active antenna unit includes a radio link control layer,
the central unit includes a packet data convergence protocol layer, and
the radio link control layer and the packet data convergence protocol layer are connected to each other by a user plane interface and a control plane interface.

8. The base station apparatus of claim 1, wherein:
the remote active antenna unit includes an active antenna system, a physical layer, a medium access control layer, and a radio link control layer.

9. The base station apparatus of claim 8, wherein:
the remote active antenna unit is configured to
install and upgrade the active antenna system, the physical layer, the medium access control layer, and the radio link control layer using the software data received from an external apparatus based on a software defined radio (SDR) technology.

10. The base station apparatus of claim 1, wherein:
the central unit includes a packet data convergence protocol layer and a radio resource control layer; and
the central unit is configured to transfer and receive a control plane data transferred and received to and from the remote active antenna unit using the packet data convergence protocol layer to and from an evolved packet core using the radio resource control layer.

11. The base station apparatus of claim 1, wherein:
the central unit uses a radio protocol layer including a packet data convergence protocol layer, a radio resource control layer, an S1 application part (S1AP) layer, and a general tunneling protocol layer; and
the central unit is configured to transfer and receive a user plane data transferred and received to and from the remote active antenna unit using the packet data convergence protocol layer to an evolved packet core connected to an S1AP interface using the general tunneling protocol layer.

12. The base station apparatus of claim 1, wherein:
the central unit is operated on a virtualization platform; and
the central unit includes a local gateway providing a local brake out service and a cache storing a data to be transferred to the terminal.

13. A base station apparatus, comprising:
a remote active antenna unit is configured to perform transmission and reception of a wireless signal to and from a terminal; and
a central unit connected to the remote active antenna unit and configured to transfer resource allocation information to the remote active antenna unit, wherein the remote active antenna unit is configured to schedule a data and a resource for the terminal based on the resource allocation information received from the central unit and includes a plurality of protocol layers connected to an evolved packet core, and wherein the remote active antenna unit includes a radio resource control layer, an S1 application part (S1AP) layer, and a general tunneling protocol layer.

14. The base stataoin apparatus of claim 13, wherein:
the radio resource control layer and the S1AP layer are connected to each other by the evolved packet core and a control plane interface; and
the general tunneling protocol layer is connected to the evolved packet core by a user plane interface.

15. The base station apparatus of claim 13, wherein:
the remote active antenna unit includes a distributed radio resource manager configured to perform scheduling for allocating a radio resource to the terminal based on the resource allocation information;
the central unit includes a concentrated-radio resource manager configured to receive a radio resource allocation requirement and channel state information of the terminal from the distributed radio resource manager and configured to transfer the resource allocation information to the distributed radio resource manager based on the received information; and
the distributed radio resource manager and the concentrated-radio resource manager are connected to each other by a radio resource management interface.

16. The base station apparatus of claim 15, wherein:
one central unit is connected to a plurality of remote active antenna units; and
one concentrated-radio resource manager is connected to a plurality of distributed radio resource managers.

17. The base station apparatus of claim 15, wherein:
the distributed radio resource manager is configured to perform a coordinated multipoint operation including at least one of transport packet synchronization between Tx points (TPs), a retransmission control and a scheduling control, and optimal precoding of the Tx point (TP), based on the radio resource management information received from the concentrated-radio resource manager.

18. The base station apparatus of claim 15, wherein:
the remote active antenna unit is configured to use a protocol layer including an active antenna system, a physical layer, a medium access control layer, a radio link control layer, a packet data convergence protocol layer, a radio resource control layer, an S1AP layer, and an a general tunneling protocol layer.

19. The base station apparatus of claim 18, wherein:
the remote active antenna unit is configured to upgrade the protocol layer and the distributed radio resource manager using a software data received from an external apparatus based on a software defined radio (SDR) technology.

20. A resource management method of a base station apparatus including a remote active antenna unit and a central unit, the resource management method comprising:
receiving, by the central unit, a radio resource allocation requirement and channel state information of a terminal from the remote active antenna unit;
transferring resource allocation information to the remote active antenna unit based on the radio resource allocation requirement and the channel state information; and
scheduling, by the remote active antenna unit, a data and a resource for the terminal based on the resource allocation information,
wherein the scheduling comprises performing a coordinated multipoint operation including transport packet synchronization between Tx points (TPs), a retransmission control and a scheduling control, and optimal precoding of the Tx point (TP) based on the resource allocation information.

21. A data processing method of a base station apparatus including a remote active antenna unit and a central unit, the data processing method comprising:
processing, by the central unit, a control plane data and a user plane data received from an evolved packet core;
transferring, by the central unit, the control plane data and the user plane data to the remote active antenna unit through an interface between protocol layers distributed in the remote active antenna unit and the central unit, and
transferring, by the remote active antenna unit, the control plane data and the user plane data received from the central unit to the terminal,
wherein the remote active antenna unit performs a coordinated multipoint operation including transport packet synchronization between Tx points (TPs), a retransmission control and a scheduling control, and optimal precoding of the Tx point (TP), based on a resource allocation information received from the central unit.

22. The data processing method of claim 21, wherein:
the interface between the protocol layers is an interface between a packet data convergence protocol layer, a radio resource control layer, an S1 application part (S1AP) layer, and a general tunneling protocol layer that are distributed in the central unit and a radio link control layer, a medium access control layer, and a physical layer that are distributed in the remote active antenna unit.

23. A data processing method of a base station apparatus including a remote active antenna unit and a central unit, the data processing method comprising:
receiving, by the remote active antenna unit connected to the central unit by a radio resource management interface, a control plane data and a user plane data from an evolved packet core; and
transferring the control plane data and the user plane data to a terminal,
wherein the remote active antenna unit performs a coordinated multipoint operation including transport packet synchronization between Tx points (TPs), a retransmission control and a scheduling control, and optimal precoding of the Tx point (TP), based on a resource allocation information received from the central unit.

24. The data processing method of claim 23, wherein the receiving includes:
receiving the control plane data using a radio resource control layer and an S1AP layer connected to the evolved packet core; and
receiving the user plane data using a general tunneling protocol layer connected to the evolved packet core.

* * * * *